United States Patent [19]

Kato et al.

[11] 4,231,900
[45] Nov. 4, 1980

[54] METHOD FOR FORMING ACTIVATED ALUMINA COATING ON REFRACTORY ARTICLE AND ARTICLE THEREBY PRODUCED

[75] Inventors: Tadanari Kato; Tadashi Ikemi; Takatoshi Sagawa, all of Yokohama, Japan

[73] Assignee: Nissan Motor Company, Limited, Yokohama, Japan

[21] Appl. No.: 892,035

[22] Filed: Mar. 31, 1978

Related U.S. Application Data

[63] Continuation-in-part of Ser. No. 684,243, May 7, 1976, abandoned, which is a continuation of Ser. No. 466,074, May 1, 1974, abandoned.

[30] Foreign Application Priority Data

May 24, 1973 [JP] Japan .................................. 48-58127

[51] Int. Cl.² .......................... B01J 23/62; B01J 23/82
[52] U.S. Cl. .......................... 252/466 PT; 423/213.5; 427/376.2; 427/380; 427/404; 427/431; 427/343
[58] Field of Search ........... 427/376 R, 376 A, 376 B, 427/380, 336, 243, 343, 246, 230, 404, 431, 430 B, 419 A; 252/313 R, 466 PT; 423/213.5; 428/539, 472

[56] References Cited

U.S. PATENT DOCUMENTS

| | | | |
|---|---|---|---|
| 3,013,901 | 12/1961 | Bugosh | 428/248 |
| 3,013,903 | 12/1961 | Bugosh | 428/248 |
| 3,447,893 | 6/1969 | Stephens et al. | 423/213.5 |
| 3,554,929 | 1/1971 | Aarons | 423/213.5 |
| 3,565,830 | 2/1971 | Keith et al. | 423/213.5 |
| 3,690,921 | 9/1972 | Elmore | 156/2 |
| 3,734,767 | 5/1973 | Church et al. | 106/57 |
| 3,767,453 | 10/1973 | Hockstra | 252/313 |
| 3,842,017 | 10/1974 | Armistead et al. | 427/404 |
| 3,870,545 | 3/1975 | Tabacek et al. | 252/313 |
| 3,926,702 | 12/1975 | Oki et al. | 427/243 |
| 4,062,810 | 12/1977 | Vogt et al. | 423/213.2 |

FOREIGN PATENT DOCUMENTS

| | | | |
|---|---|---|---|
| 1231993 | 10/1960 | France | 252/462 |
| 1017004 | 1/1966 | United Kingdom | 427/404 |
| 1018034 | 1/1966 | United Kingdom | 252/462 |
| 1052105 | 12/1966 | United Kingdom | 252/462 |
| 1212889 | 11/1970 | United Kingdom | 252/462 |
| 1321520 | 6/1973 | United Kingdom | 252/462 |

Primary Examiner—Ronald H. Smith
Assistant Examiner—Sadie L. Childs
Attorney, Agent, or Firm—Robert E. Burns; Emmanuel J. Lobato; Bruce L. Adams

[57] ABSTRACT

A mixture is prepared by mixing alumina sol and activated alumina which contains not less than 60 Wt % of delta-alumina. The mixture is thereafter coated on a relatively small specific surface area monolithic catalyst carrier. After being dried, the coated carrier is fired to give a high specific surface area catalyst carrier.

16 Claims, 4 Drawing Figures

METHOD FOR FORMING ACTIVATED ALUMINA COATING ON REFRACTORY ARTICLE AND ARTICLE THEREBY PRODUCED

BACKGROUND OF THE INVENTION

This application is a continuation-in-part of application Ser. No. 684,243 filed on May 7, 1976, now abandoned continued from application Ser. No. 466,074 filed May 1, 1974 now abandoned.

The present invention relates to a method for making a catalyst carrier for use in a catalytic converter for purification of a noxious waste gas and more particularly to a method for making a monolithic catalyst carrier for use in a catalytic converter for purification of exhaust gases from automobile engines.

As is well known, there has been hitherto proposed a refractory monolithic catalyst carrier for use in a catalytic converter of an exhaust purifying system, for example, of an internal combustion engine. This monolithic carrier is generally a solid, unitary body having a plurality of unobstructed openings therethrough in a direction of desired fluid flow. An example of such a shape of body is known as a honeycomb structure. In addition, the monolithic catalyst carrier is, in general, made of a refractory ceramic material such as mullite, cordierite, β-spodumene so as to endure elevated temperatures of the engine exhaust. For use as the catalytic converter, the monolithic catalyst carrier is usually impregnated with a catalytic component such as a platinum group metal by immersion; this monolithic carrier has disadvantages in that the carrier cannot securely carry a sufficient amount of catalytic component on the inner surface of the openings thereof because of its relatively low specific surface area and relatively low porosity or smooth, not rugged, surface. These disadvantages result in an unsatisfactory conversion efficiency of the catalytic converter for conversion of harmful components in the exhaust gases into harmless ones, and the poor durability of the catalytic component due to migration thereof from the surface of the carrier.

SUMMARY OF THE INVENTION

It is the prime object of the present invention to provide a method for making an improved catalyst carrier which contributes to the satisfactory conversion efficiency and the extreme durability of a catalytic converter using the catalyst carrier.

It is another object of the present invention to provide a method for making an improved monolithic catalyst carrier which can securely carry a relatively large amount of catalytic component on the surface thereof.

It is still another object of the present invention to provide a method for making an improved monolithic catalyst carrier having a surface with a relatively high specific surface area and relatively high porosity.

It is a further object of the present invention to provide a method for forming an improved high surface area coating on the surface of a monolithic catalyst carrier which coating is excellent in thermal durability.

It is still further object of the present invention to provide a method for preparing a catalyst for purification of a high temperature waste gas, which catalyst exhibits high performance even under an excessively high temperature condition.

It is a still further object of the present invention to provide a method for preparing a catalyst for purifying high temperature exhaust gases from automobile engines, which catalyst exhibits high conversion efficiency of noxious components contained in the exhaust gases even under an excessively high temperature condition.

Other objects, features and advantages of the present invention will be more apparent from the following description in conjunction with the drawings.

PREFERRED EMBODIMENTS OF THE INVENTION

Figure 1:
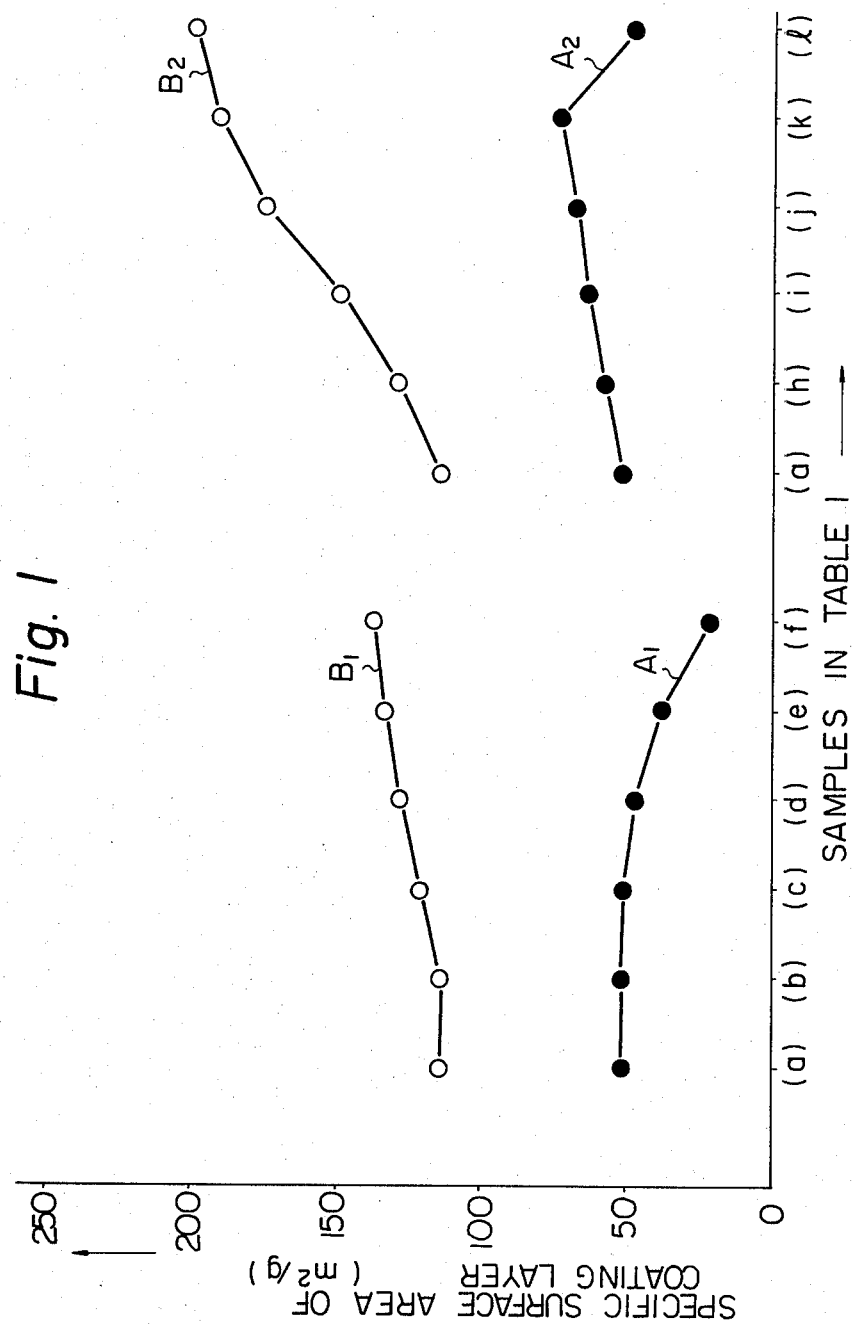
FIG. 1 is a graph showing variations in the specific surface areas of coating layers on catalyst carriers before and after a thermal durability test, in terms of varied amount of delta-alumina contained in activated alumina before coated on the carrier.

In accordance with the method of the present invention, a mixture containing activated alumina and/or aluminum hydroxide and alumina sol is first prepared. The mixture is coated onto the surface of an available monolithic catalyst carrier or a carrier base. In this case, the alumina sol serves as a binder for adhesion of the activated alumina onto the surface of the catalyst carrier. The coated carrier is, after drying, fired by heating at an elevated temperature.

The monolithic catalyst carrier used in the present invention is a solid, unitary body having a plurality of unobstructed openings therethrough in a direction of desired fluid flow and is preferably of a size that permits occupancy by the body of at least a major portion of the cross-sectional area of the reaction zone to be employed. The carrier is constructed of a substantially chemically inert, rigid, solid material capable of maintaining its shape and strength at high temperatures, for instance up to 1100° C. The material includes ceramic materials such as mullite, cordierite, and β-spodumene. This refractory monolithic catalyst carrier is now commercially available in the open market.

Any kind of activated alumina which is commercially available is usable. Alternatively to the activated alumina according to the present invention, aluminum hydroxide may be used, which is produced by precipitation reactions between an aluminum salt and one of potassium hydroxide, sodium hydroxide, aqueous ammonia, sodium carbonate, ammonium carbonate etc. The aluminum hydroxide when used is finally converted into activated alumina by the firing step according to the present invention. The activated alumina or the aluminium hydroxide of the present invention is usually used not only in powder form but also in granule or pellet forms.

The alumina sol which serves as a binder for adhesion of the activated alumina and the aluminum hydroxide onto the surface of the carrier is prepared by dispersing alumina in powder form into any suitable dispersion medium such as water, alcohols, and ethers. The sol contains 3 to 15% by weight of alumina. It is to be noted that alumina sol containing more than 15% by weight of alumina has excellent adhesiveness and is suitable for a binder, but this concentration of the sol causes difficulties in that the surface of the monolithic carrier cannot be uniformly coated with the sol due to the excessively high viscosity thereof. Contrastingly, a sol containing less than 3% by weight of the same has poor adhesiveness and is not suitable as a binder, and results in insufficient porosity on the surface coated with the activated alumina. Accordingly it is necessary to select the optimal concentration of alumina sol suitable for the shape and size of the carrier within the range of 3 to 15 Wt% of alumina.

The mixture composition of the activated alumina and/or the aluminum hydroxide and the alumina sol preferably consists of 1 part by weight of the activated alumina or the aluminum hydroxide and not more than 20 parts by weight of the alumina sol. It should be noted that if the alumina sol content is more than 20 parts by weight, the mixture is also unusable because of insufficient content of the activated alumina and/or the aluminum hydroxide. Therefore, 1 part by weight of one of the activated alumina and the aluminum hydroxide is taken to not more than 20 parts by weight of the alumina sol in the method of the present invention. The optimum composition of the mixture should be selected according to the shape and size of the carrier.

In preparation of the mixture containing the activated alumina and/or the aluminum hydroxide and the alumina sol, where the particle size of the activated alumina and/or aluminium hydroxide is less than 30 microns, a single operation of adequate mixing of the both components with a stirrer is sufficient. Whereas, if the particle size is more than 30 microns, the activated alumina and the aluminium hydroxide should be pulverized by a pulverizer such as a ball mill either before or after the mixing with the alumina sol.

The operation of coating the mixture is accomplished by pouring, spraying or painting the mixture onto the inner surfaces of the unobstructed openings of the monolithic carrier, or by immersing the carrier into the mixture. In this coating operation, the commercially available monolithic carrier is usually used as is. However, preferably the carrier is treated with acids such as nitric acid, sulfuric acid, hydrochloric acid, formic acid and acetic acid, or alkalis such as sodium hydroxide, potassium hydroxide, ammonia, sodium carbonate and ammonium carbonate either before or after the coating operation. Thus, the mixture coated on the carrier can be rapidly solidified without long drying, because gelation of the alumina sol in the mixture is accelerated by the acids or alkalis the gelation of alumina sol being known in the art. This gelation treatment prevents the local concentration of the activated alumina or the aluminum hydroxide in the mixture coated on the carrier, which would otherwise occur under the influence of gravity on the particles. This treatment therefore results in a more uniform distribution of activated alumina or aluminum hydroxide on the surface of the monolithic carrier.

The coated monolithic carrier is, after drying well, fired by heating in air at a predetermined temperature of 150° to 850° C. for a predetermined time of 0.5 to 20 hours, preferably at 300° to 700° C. for 1 to 5 hours to obtain the complete monolithic catalyst carrier according to the present invention. In this case, if the firing temperature exceeds 850° C., the activated alumina will lose its activity. If the temperature does not exceed 150° C., the hydrated water of the alumina cannot be expelled.

As a result of the above-mentioned operations according to the present invention, the specific surface area the monolithic carrier increases, for example, from about 2.1 $m^2/g$ (before coating) to about 33 to 22 $m^2/g$ that is to say, the specific surface area increases to about 10 to 17 times of that before coating. The porosity of the monolithic carrier also increases, for example, from about 0.32 cc/g (before coating) to about 0.34 to 0.40 cc/g; that is to say, porosity increases by about 6 to 25%.

For use as a catalytic converter for an internal combustion engine, the resultant catalyst carrier may be, as is well known, immersed into a solution containing a catalytic component or metal such as a nobel metal including a platinum group metal, to impregnate the rugged surface of the carirer with the catalytic component.

The following examples are given for the purpose of further illustrating the method of the present invention and to indicate the benefits afforded through the utilization thereof. It is not intended that the present invention be limited to the description within the examples.

EXAMPLE 1

A mixture of 5 parts by weight of alumina sol containing 8% by weight of alumina component and 1 part by weight of activated alumina powder (particle size 2 microns) was prepared by sufficient mixing with each other. The mixture was poured onto the surface of a commercially available honeycomb monolithic carrier made of cordierite. After the excess mixture was allowed to drain off, the monolithic carrier coated with the mixture was dried at 110° C. for 5 hours, and thereafter fired by heating in an electric furnace at 500° C. for 3 hours.

As a result of this coating operation, the resultant honeycomb monolithic carrier increased in the specific surface area from 2.1 $m^2/g$ (before coating) to 26 $m^2/g$ and in the porosity from 0.32 cc/g (before coating) to 0.34 cc/g. In addition, a catalytic converter using the honeycomb monolithic carrier prepared according to this method experimentally showed excellent results in its activity and life.

EXAMPLE 2

A commercially available honeycomb monolithic carrier made of cordierite was immersed in a mixture of 3 parts by weight of the same alumina sol as in EXAMPLE 1 and 1 part by weight of activated alumina powder (particle size 2 microns) which mixture was prepared by sufficient mixing. After the carrier was removed from the mixture and the excess mixture was allowed to drain off, the carrier was dried at 110° C. for 5 hours, thereafter fired by heating in an electric furnace at 500° C. for 3 hours.

As a result of this coating operation, the resultant honeycomb monolithic carrier increased in the specific surface area from 2.1 $m^2/g$ (before coating) to 33 $m^3/g$ and in the porosity from 0.32 cc/g (before coating) to 0.40 cc/g. In addition, a catalytic converter using the honeycomb monolithic carrier prepared according to this method experimentally showed excellent results in its activity and life.

EXAMPLE 3

A mixture of 10 parts by weight of the same alumina sol as in EXAMPLE 1 and 1 part by weight of the activated alumina (2 microns of particle size) was prepared by sufficient mixing. The mixture was poured onto the surface of a commercially available honeycomb monolithic carrier. After the excess mixture was allowed to drain off, the coated monolithic carrier was dried at 110° C. for 5 hours, thereafter fired by heating in an electric furnace at 500° C. for 3 hours.

As a result, the resultant honeycomb monolithic carrier increased in the specific surface area from 2.1 $m^2/g$ (before coating) to 24 $m^2/g$ and in the porosity from 0.32 cc/g (before coating) to 0.35 cc/g. In addition, a catalytic converter using the honeycomb monolithic carrier prepared according to this method experimentally showed excellent results in its activity and life.

EXAMPLE 4

A commercially available honeycomb monolithic carrier made of cordierite was immersed in a mixture of 15 parts by weight of same alumina sol as in EXAMPLE 1 and 1 part by weight of activated alumina (particle size 2 microns) which mixture was prepared by sufficient mixing. After the carrier was removed from the mixture and the excess mixture allowed to drain off, the carrier was dried at 110° C. for 5 hours, thereafter fired by heating at 500° C. for 3 hours.

As a result, the resultant honeycomb monolithic carrier increased in the specific surface area from 2.1 $m^2/g$ (before coating) to 22 $m^2/g$ and in the porosity from 0.32 cc/g (before coating) to 0.34 cc/g. In addition, a catalytic converter using the honeycomb monolithic carrier prepared according to this method experimentally showed excellent results in its activity and life.

EXAMPLE 5

A honeycomb monolithic carrier the same as in EXAMPLE 1 was immersed into an aqueous solution of 3% sodium hydroxide for 10 minutes. After the carrier was removed from the solution and the excess solution was allowed to drain off, the carrier still wetted with the solution was coated by pouring with a mixture of 6 parts by weight of alumina sol containing 3% by weight of alumina content and 1 part by weight of activated alumina (particle size 2 microns) which mixture was prepared by sufficient mixing. After the excess mixture was allowed to drain off, the coated carrier was dried at 110° C. for 5 hours, thereafter fired by heating in an electric furnace at 500° C. for 3 hours.

As a result of this coating operation, the resultant honeycomb monolithic carrier increased in the specific surface area to 28 $m^2/g$ and in porosity to 0.34 cc/g. In addition, a catalytic converter using the carrier prepared according to this method experimentally showed excellent results in its activity and life.

EXAMPLE 6

A mixture of 5 parts by weight of alumina sol containing 5% by weight of alumina content and 1 part by weight of activated alumina (particle size 2 microns) was prepared by sufficient mixing with each other. The mixture was poured onto a honeycomb monolithic carrier the same as in EXAMPLE 1. Immediately after the excess mixture was drained off, the coated carrier was placed in a container filled with a 100% ammonia atmosphere to be allowed to stand for 2 hours. After being removed from the container, the coated carrier was dried at 110° C., thereafter fired by heating in an electric furnace at 500° C. for 3 hours.

As a result, the resultant honeycomb monolithic carrier increased in the specific surface area to 32 $m^2/g$ and in the porosity to 0.35 cc/g. A catalytic converter using the carrier prepared according to this method experimentally showed excellent results in its activity and life.

EXAMPLE 7

A honeycomb monolithic carrier the same as in EXAMPLE 1 was immersed into an aqueous solution of 9% nitric acid for 2 hours. After the carrier was removed from the solution and the excess solution was drained, the carrier still wetted with the solution was coated, by pouring, with a mixture of 5 parts by weight of alumina sol containing 10% by weight of alumina content and 1 part by weight of activated alumina which mixture was prepared by sufficient mixing. After the excess mixture was drained, the coated carrier was dried at 110° C. for 5 hours, and thereafter fired by heating in an electric furnace at 500° C. for 3 hours.

As a result of this coating operation, the resultant honeycomb monolithic carrier increased in the specific surface area to 29 $m^2/g$ and in the porosity to 0.33 cc/g. In addition, a catalytic converter using the carrier prepared according to this method experimentally showed excellent results in its activity and life.

Aside from the before-mentioned fact, the inventors have found that the activated alumina (before being coated on the carrier) of present invention preferably contains not less than 60 Wt% of delta-alumina in order to give excellent thermal durability on a high surface area coating or a coating layer formed on the carrier and on the final catalyst using the carrier with that coating layer. This will be explained hereinafter with reference to EXAMPLE 8.

EXAMPLE 8

This Example shows the reason why the above-mentioned not less than 60 Wt% of delta-alumina in the activated alumina is preferable, in comparison with other various cases in which delta-alumina is contained in the amount less than 60 Wt% in the activated alumina (before being coated on the carrier).

1. Preparation of catalysts

An alumina sol-activated alumina mixture was prepared by adding 1000 g of activated alumina (one of Samples (a) to (f) and (h) to (l) which will be shown in Table 1) having grain size of 1–3 mm in diameter was added to 3000 g of alumina sol (colloidal boehmite) containing 7.5 Wt% of alumina component. The alumina sol was sold under the trade name of "AS-200" by Nissan Chemical Industries Ltd. The mixture was thereafter milled and mixed for approximately 6 hours in a porcelain ball mill (inner diameter: 200 mm, lenth: 300 mm) which was rotated at about 80 revolution per minute to yield an alumina slurry containing 58 to 75 Wt% of alumina particles whose diameters were not more than 6 microns and 1 to 5 Wt% of alumina particles whose diameters were not less than 20 microns. The alumina slurry contained 30 Wt% of alumina content. The viscosity of the alumina slurry measured 13 seconds by a Ford Viscosity Cup, No. 4 (ASTM-D1200).

The alumina slurry was poured to the surface of a commercially available monolithic carrier made of cordierite. The monolithic carrier was sold under the trade name of "Honeyceram" by NGK Insulators, Ltd. (in Japan). The monolithic carrier was weighed 935 g and elliptic in cross-section having the longest diameter of 170 mm and the shortest diameter of 80 mm, and of 143 mm length, with square parallel passageways along the 143 mm length. There were 300 parallel passageways per square inch, having the passageway wall thickness of approximately 0.3 mm.

The excess slurry in the passageways of the carrier was removed by blowing off it firstly with air of 0.45 Kg/cm$^2$ and secondly with air of 0.3 Kg/cm$^2$. Thereafter, the carrier coating with the alumina slurry was dried by putting it in a stream of hot air of 130° C. for about 1 hour so that the hot air was passed through the passageways of the carrier, and then fired raising the firing temperature from 100° to 650° C. within about 3 hours and thereafter maintaining 650° C. for about 3 hours. The above-mentioned coating operation of the alumina slurry was repeated to give approximately 174 g of the high surface area coating or the coating layer on the surface of the monolithic carrier.

This coated carrier was immersed for about 1 minute in 2200 ml of a solution (at 30° C.) containing 1 g/l of Pt (as metal) and 0.5 g/l Pd (as metal) to impregnate the carrier with these catalytic metals. The solution was contained in a plastic container which was elliptic in cross-section having the longest diameter of 200 mm and the shortest diameter of 100 mm, and of the 250 mm height. After being taken out from the solution, the excess solution on the impregnated carrier was drained using an air stream of 0.3 Kg/cm$^2$ and then the impregnated carrier was dried at about 130° C. for about 40 minutes. The dried impregnated carrier was thereafter fired at about 550° C. for about 3 hours to give a final catalyst. The final catalyst weighed approximately 1110 g. The supported or carried amounts of platinum and palladium on the final catalyst were expected to be 17 g/cubic feet and 8 g/cubic feet, respectively, which amounts were derived from the corresponding analytic values of a final catalyst which had been prepared by the similar manner to EXAMPLE 8.

TABLE 1

| Sample | Composition of Activated alumina | |
|---|---|---|
| | δ-alumina(g) | Mixture(g) of γ- and χ-aluminas |
| (a) | 1000 | 0 |
| (b) | 800 | 200 |
| (c) | 600 | 400 |
| (d) | 400 | 600 |
| (e) | 200 | 800 |
| (f) | 0 | 1000 |
| | δ-alumina(g) | γ-alumina(g) |
| (h) | 800 | 200 |
| (i) | 600 | 400 |
| (j) | 400 | 600 |
| (k) | 200 | 800 |
| (l) | 0 | 1000 |

Note
[1] δ-alumina was sold under the trade name of "SCS-79" by Rhône-Poulenc (in France) and its starting material was boehmite.
[2] The mixture of γ- and χ-aluminas was sold under the trade name of "ACBR-3" by Catalyst & Chemicals Industries Co., Ltd. (in Japan). The "ACBR-3" was detected to be the mixture of γ- and χ-aluminas by X-ray diffraction analysis and its starting material was gibbsite.
[3] γ-alumina was prepared by calcining an alumina, sold under the trade name of "AS-200" mentioned above, at about 750° C. for about 3 hours.

2. Evaluation of Performance (1) Measurement of specific surface of coating layer.

The specific surface areas of the various coated carrier (before immersion in the solution containing the catalytic metals) prepared by EXAMPLE 8 using Samples (a) to (f) and (h) to (l) in Table 1 were measured before and after a thermal durability test. The thermal durability test was conducted by heating the coated carrier in a box-type electric furnace at about 1000° C. for about 24 hours in the atmosphere of air.

The specific surface area was determined by use of the SOR-BET surface-area measuring apparatus sold by AMERICAN INSTRUMENT CO., INC. 8030 Gergia, Silver Spring, Md. 20910. This surface-area measuring apparatus is now widely used. Its operating principle is disclosed in an article titled "Adsorption of Gas in Multimolecular Layers" by S. Brunauer, P. H. Emett, E. Teller, Journal of American Chemical Society, Vol. 60, (1938).

Figure 2:
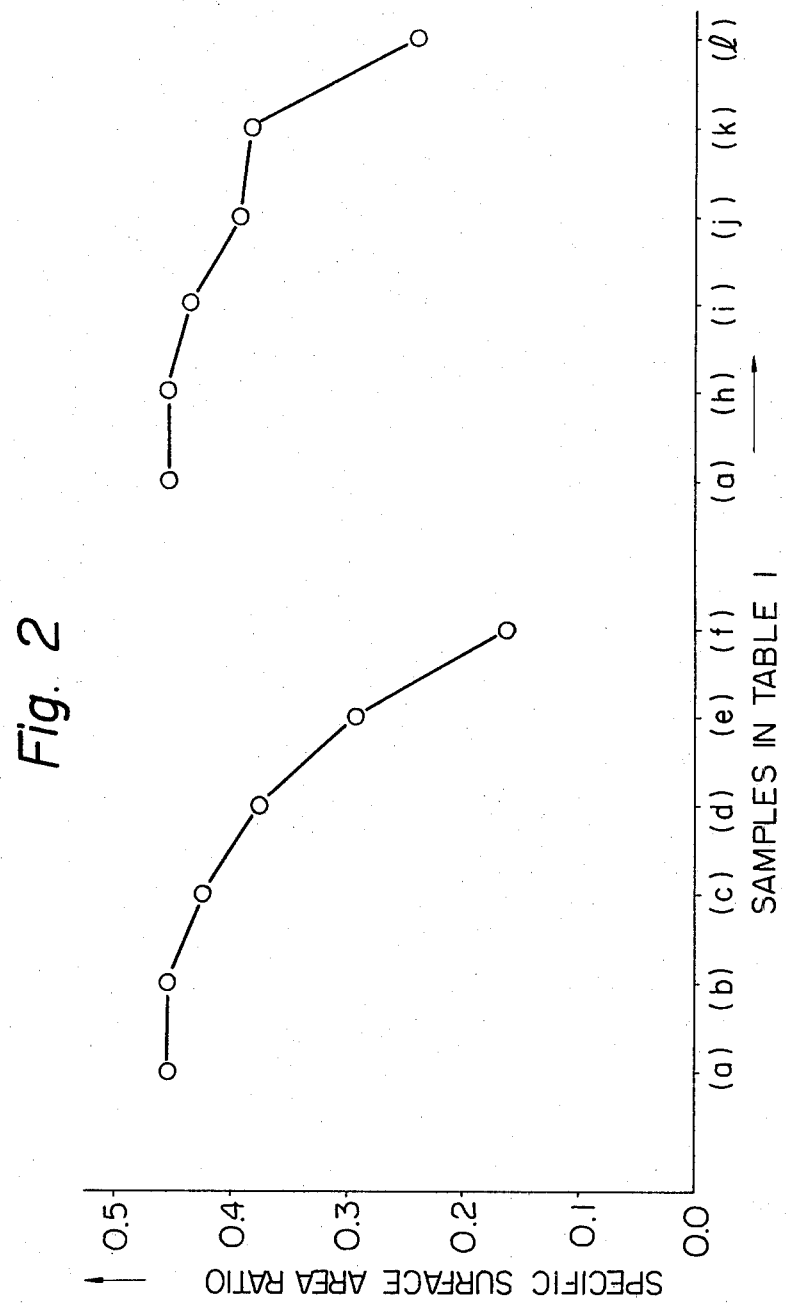
FIG. 2 is a graph showing the variations in the ratios of the specific surface areas after the thermal durability test to that before the same test, in terms of varied amount of delta-alumina contained in activated alumina before coating on the carrier.

The measured specific surface areas are plotted in the graph of FIG. 1 in which curves $B_1$ and $B_2$ represent the measured surface areas before the thermal durability test, whereas curves $A_1$ and $A_2$ represent those after the thermal durability test. Additionally, the graph of FIG. 2 was derived from the plotted values in FIG. 1 to demonstrate excellent performance of the coating layers using Samples (a), (b), (c), (h) and (i). The graph of FIG. 2 was made by plotting the specific surface area ratio or the ratio of the specific surface area after the thermal durability test to that before thermal durability test.

As clearly seen from the graph of FIG. 1, the specific surface area of coating layers using Samples (a), (b), (c), (h) and (i) were not considerably decreased after the thermal durability test with respect to before the thermal durability test, compared with the coating layer using Samples (d), (e), (f), (j), (k) and (l). Moreover, the graph of FIG. 2 demonstrates the fact that the decreasing degrees of the specific surface areas of the coating layers using Samples (d), (e), (f), (j), (k) and (l) become greater after the thermal durability test with respect to before the test, than of the coating layers using Samples (a), (b), (c), (h) and (i). Therefore, it will be understood that the thermal durability of the coating layers is particularly excellent in cases using the activated alumina (before coated) containing not less than 60 Wt% of delta-alumina, as compared with in cases using the activated alumina containing less than 60 Wt% of delta-alumina.

This seems to be caused by the following facts: since delta-alumina is previously treated at a considerably high temperature such as near 1000° C., the coating layer formed by using activated alumina (before coated) containing not less than 60 Wt% of delta-alumina is prevented from being affected by a high temperature. In other words, the fine pores of delta-alumina in the coating layer is difficult to be collapsed even when subjected to an excessively high temperature, as compared with other activated aluminas.

By virtue of high thermal durability of delta-alumina, even when the final catalyst prepared by using activated alumina containing not less than 60 Wt% of delta-alumina is used for purifying high temperature exhaust gases such as from automobile engines, the effectiveness or action of the catalytic metals carried in the fine pores of the coating layer can not be lost. In this connection, as seen from FIG. 1, in case wherein a relatively large proportion of gamma-alumina is used in activated alumina (before coated), a large amount of the fine pores seems to be exist in the coating layer before being subjected to an excessively high temperature. However, gamma-alumina is an activated alumina which is heat-treated at a temperature lower than that for delta-alumina, and therefore gamma-alumina is inferior in thermal durability as compared with delta-alumina. As a result, when the final catalyst prepared by using activated alumina (before coated) containing a relatively large proportion of gamma-alumina is used for purification of high temperature exhaust gases, a considerable collapse of the fine pores in the coating layer takes place so that the effectiveness of catalytic metals carried in the fine pores is lost to a great extent as compared with the final catalyst which is prepared by using activated alumina containing not less than 60 Wt% of delta-alumina. The above-discussed fact will be proven in item (2) described hereinafter.

While an activated alumina which is prepared by heating at a high temperature has been described to be excellent from a point of view of catalytic activity, theta-alumina which is prepared by being heat-treated at a generally higher temperature than for delta-alumina is not suitable for the purpose of obtaining high performance catalyst, because the specific surface area of a coating layer formed on the carrier is too low to carry a sufficient amount of catalytic metals. This may result in remarkable lowering in the conversion efficiency particularly of hydrocarbons in exhaust gases.

(2) Determination of Conversion Efficiency of final catalyst after thermal durability test The conversion efficiencies of the final catalysts (60 ml: 36 mm diameter×60 mm length) prepared using Samples shown in Table 1 were determined on a bench apparatus at 27,500 gas hourly space velocity (GHSV) by using a synthetic exhaust gas mixture consisting of 1 volume percent CO, 2 volume percent $O_2$, 1500 ppm $C_2H_4$, 500 ppm NO, 12 volume percent $CO_2$, 10 volume percent $H_2O$ and $N_2$ balance. This determination of the conversion efficiency was carried out after the thermal durability test which was taken place under the same condition as that in the above-mentioned item (1). The conversion efficiency of $C_2H_4$ at 300° C. was determined and plotted in FIG. 3 which demonstrates that the conversion efficiencies of the final catalysts prepared using Samples (a), (b), (c), (h) and (i) were maintained considerably high even after the thermal durability test, as compared with the final catalysts prepared using Samples (d), (e), (f), (j), (k) and (l). Therefore, it will be understood also from FIG. 3, that the final catalysts prepared using activated alumina (before being coated) containing not less than 60 Wt% of delta-alumina are excellent in thermal durability, as compared with the final catalysts prepared using activated alumina (before being coated) containing less than 60 Wt% of the same. In this connection, the conversion efficiency with regard to a particular gas component is represented as the percentage of the amount of the particular gas component converted by the final catalyst, with respect to the amount of the particular gas component in the synthetic exhaust gas mixture before contacting the catalyst.

Figure 3:
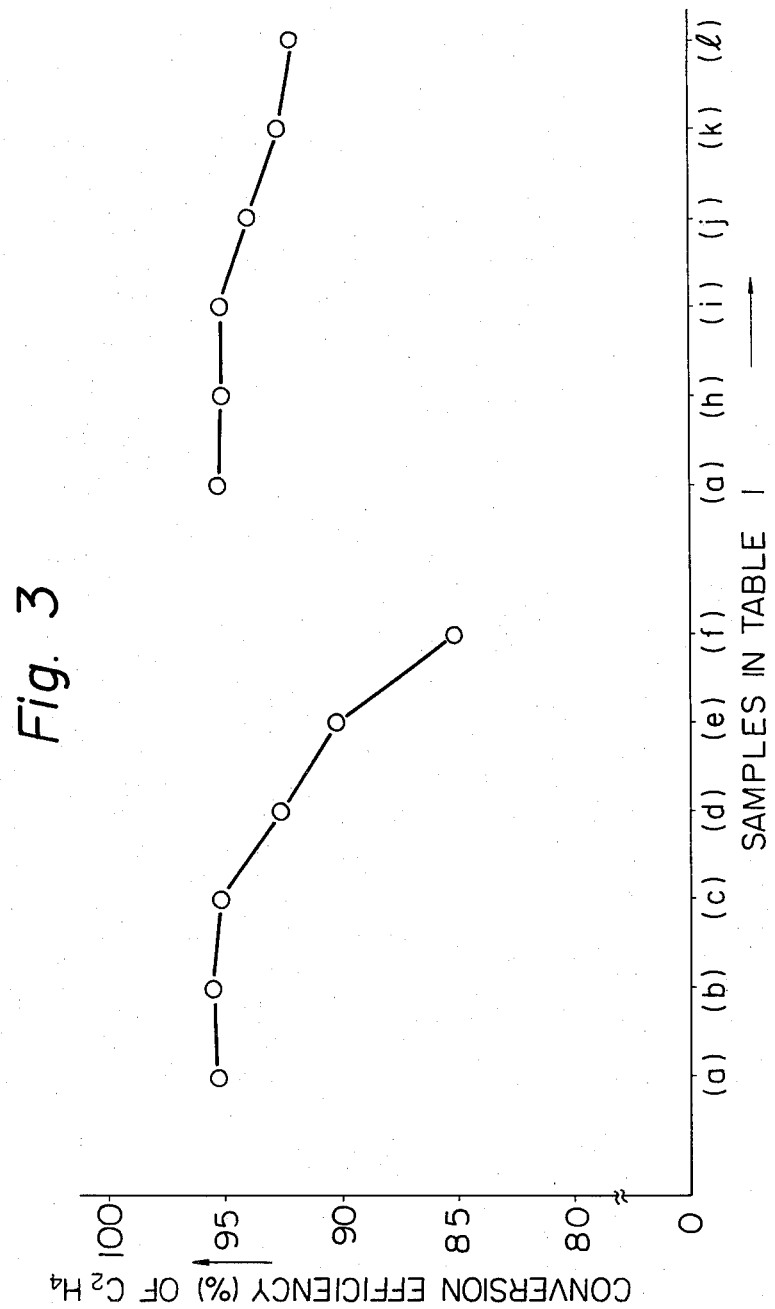
FIG. 3 is a graph showing the conversion efficiencies of final catalysts, in terms of varied amount of delta-alumina contained in activated alumina before coated on the carrier.

It seems from FIG. 3, that, in case of the final catalyst prepared by using activated alumina (before being coated) containing less than 60 Wt% of delta-alumina, a considerably large amount of the fine pores in the coating layer is collapsed to show considerable lowering in activity of catalytic metals carried in the fine pores formed at the coating layer on the carrier. On the contrary, if the final catalyst prepared by using activated alumina (before being coated) containing not less than 60 Wt% of delta-alumina, the conversion efficiency or activity of the catalyst is still considerably high even after the thermal durability test, which shows that collapse of a large amount of the fine pores does not occur when subjected to an excessively high temperature.

(3) X-ray Diffraction Analysis of Coating Layer

Table 2 shows the result of X-ray diffraction analysis of the coating layers prepared by using Samples shown in Table 1 as an activated alumina with respect to before and after the above-mentioned thermal durability test. This result demonstrates that a considerably large amount of delta-alumina was found to exist in the coating layers prepared by using activated alumina (before being coated) containing not less than 60 Wt% of delta-alumina, throughout before and after the thermal durability test. This supports the fact that particularly high thermal durability is exhibited in final catalysts having the carrier coated with the coating layer prepared by using activated alumina (before being coated) containing not less than 60 Wt% of delta alumina.

TABLE 2

| Samples | Before T. D. Test aluminas | | | After T. D. Test aluminas | | | |
|---|---|---|---|---|---|---|---|
| | δ | γ | χ | δ | κ | θ | α |
| (a) | A | None | None | A | None | A | D |
| (b) | A | C | D | A | None | A | D |
| (c) | A | B | C | A | D | B | C |
| (d) | B | A | B | C | B | B | C |
| (e) | C | A | B | D | B | B | B |
| (f) | None | A | A | None | D | C | B |
| (h) | A | C | None | A | None | A | D |
| (i) | A | B | None | A | None | A | D |
| (j) | B | A | None | A | None | A | C |
| (k) | C | A | None | A | None | A | C |
| (l) | None | A | None | B | None | B | A |

Note:
The amount of alumina is A > B > C > D.

(4) Measurement of Peeled Alumina Amount from the Coating Layer

Each coated carrier (before immersion in the solution containing the catalytic metals) prepared by EXAMPLE 8 was dipped in one liter of water contained in a vessel having a volume of 12 liters, which vessel forms part of a device solid under the trade name of "Ultrasonic Tank" by Kaijo Denki Co., Ltd. (in Japan). The coated carrier is of a cylindrical shape having a diameter of 50 mm and a length of 60 mm. Thereafter, ultrasonic vibration (29 KHz, 150 W) was applied to the coated carrier through water for about 20 minutes. The amount of alumina which was peeled off from the carrier was then measured to calculate the peeled alumina amount (Wt%) of the coating layer, based on the weight of the coating layer.

Figure 4:
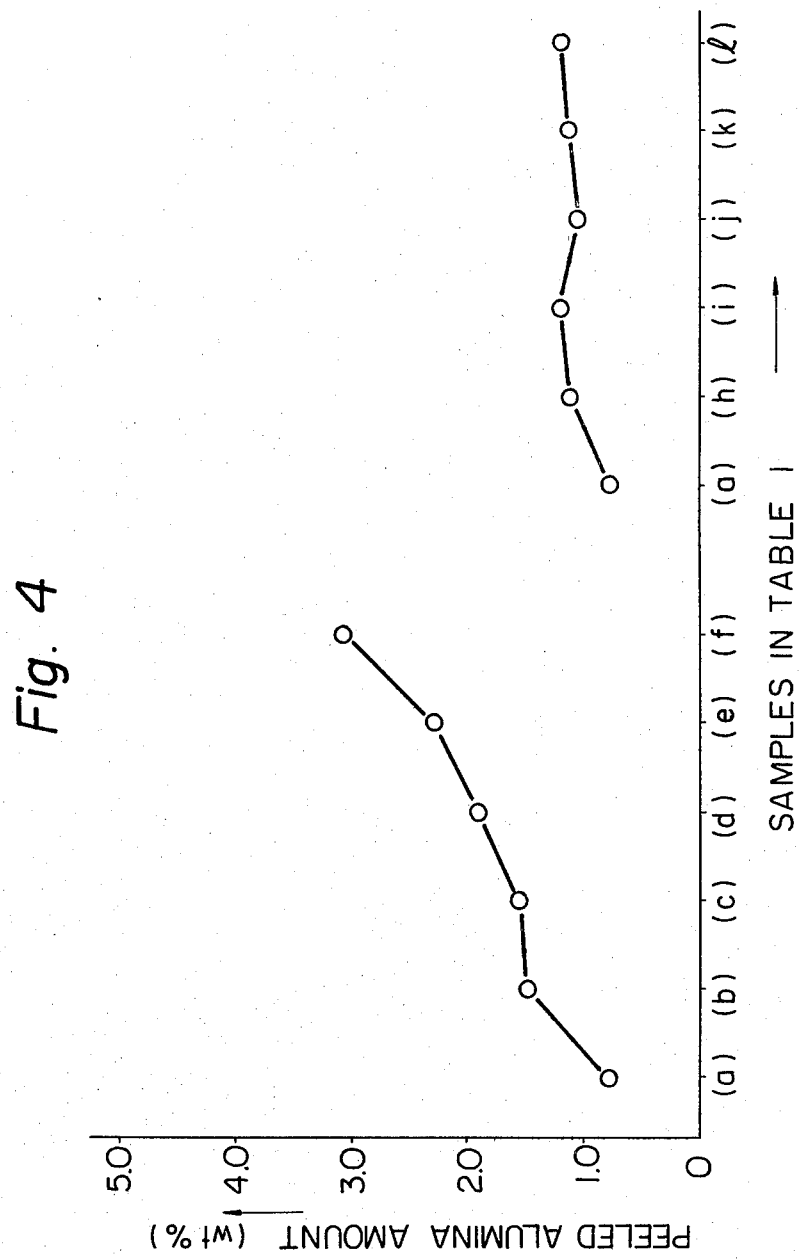
FIG. 4 is a graph showing the amounts of materials peeled off from the coating layers on the carriers, in terms of varied amount of delta-alumina contained in activated alumina before being coated on the carrier.

The peeled alumina amounts from the coating layers in various cases are shown in FIG. 4 which demonstrates that the peeled alumina amount of the final catalysts prepared using Samples (d), (e) and (f) are considerably great. Hence, if the activated alumina to be coated does not contain not less than 60 Wt% of delta-alumina, the coating layer formed on the carrier is excessively peeled off from the surface of the carrier, causing the catalytic metals carried to peel off from the surface of the coated layer on the carrier. Therefore, such a catalyst is not suitable for purifying exhaust gases from automobile engines.

Moreover, it is preferable that the alumina sol is prefared by using alumina whose starting material is boehmite, and the starting material of the activated alumina is boehmite to improve adhesion of the coating layer on the surface of the carrier. In this connection, if the starting material of the activated alumina is gibbsite while the alumina sol is prepared by using alumina whose starting material is boehmite, the coating layer may be liable to peel off from the surface of the carrier.

(5) Determination of Activity of Catalysts on Actual Automobile Engine

Each of three catalysts having the carriers prepared by using Samples (a), (f) and (l) shown in Table 1 as activated alumina was mounted at its position of the exhaust system of an automobile engine of 4-cylinder type having a displacement of 2 liters. Then, the engine was controlled to be operated to expose the catalyst to the exhaust gases of the engine for about 127.5 hours under conditions in which the inlet gas temperature of the catalyst was 950±5° C., the gas hourly space velocity (GHSV) was 130,000 hr$^{-1}$, the inlet gas composition of the catalyst was 0.01–0.05 Vol% CO; 14.5–14.8 Vol% $CO_2$; 100–200 ppm hydrocarbons (HC).

After exposed to the exhaust gases under the above-mentioned condition, the activity of the catalysts was evaluated on an automobile engine of 4-cylinder type having a displacement of 1.8 liters under conditions in which the gas hourly space velocity of the exhaust gases was 56,000 hr$^{-1}$, the inlet gas temperature of the catalyst was 150°–400° C. in which the increasing rate of temperature was 5°–7° C. per minute, the inlet gas composition was 0.76±0.04 vol% CO; 11.1±0.15 vol% $CO_2$; 1920±95 ppm hydrocarbons; and 1850±140 ppm NO. The evaluation of the activity was carried out by measuring particular temperature at which CO and hydrocarbons in the exhaust gases were converted by 50 vol% and the conversion efficiencies of CO and hydrocarbons at 400° C. to obtain Table3.

As seen from Table 3, the catalyst having the carrier prepared by using Sample (a) shown in Table 1 is excellent both in the temperature at which CO and hydrocarbons are converted by 50 Vol% and in the conversion efficiency at 400° C. Therefore, Table 3 demonstrates that the catalyst prepared by using activated alumina (before being coated on the carrier) containing not less than 60 Wt% of delta-alumina is excellent even when mounted on the exhaust system of automobile engines, as compared with other catalysts prepared by using activated alumina (before being coated) containing less than 60 Wt% of delta-alumina.

TABLE 3

| Samples | CO $T_{50}$(°C.) | CO $n_{400}$(%) | HC $T_{50}$(°C.) | HC $n_{400}$(%) |
|---|---|---|---|---|
| (a) | 272 | 98.7 | 278 | 83.7 |
| (f) | not less than 400 | 47 | 386 | 57 |
| (l) | 328 | 98.0 | 333 | 79.3 |

Note:
$T_{50}$ = the temperature (°C.) at which a component gas is converted by 50 vol%.
$n_{400}$ = the conversion efficiency (%) of a component gas at 400° C.

What is claimed is:

1. A method for forming a high surface area coating on the surface of a monolithic catalyst carrier, said method comprising the steps of:
   preparing a mixture containing not more than 20 parts by weight of alumina sol and one part by weight of activated alumina, said alumina sol containing 3 to 15 Wt % of alumina, said activated alumina containing not less than 60 Wt % of delta-alumina;
   coating said mixture onto the surface of the catalyst carrier;
   drying the coated catalyst carrier; and
   firing the coated catalyst carrier at a temperature in the range of 150° to 850° C. for a time in the range of from 0.5 to 20 hours to form the high surface area coating on the surface of the catalyst carrier.

2. A method as claimed in claim 1, in which said alumina sol is prepared by using alumina whose starting material is boehmite, and the starting material of said activated alumina is boehmite.

3. A method as claimed in claim 2, further comprising the step of applying an acid or an alkali onto the surface of the catalyst carrier before coating said mixture onto the surface of the same.

4. A method as claimed in claim 3, further comprising the step of gelling said alumina sol in said mixture by applying an acid or an alkali after coating said mixture onto the surface of the catalyst carrier.

5. A method as claimed in claim 2, wherein said temperature is in the range of 300° to 700° C.

6. A method as claimed in claim 5, wherein said time is in the range of from 1 to 5 hours.

7. A method for preparing a catalyst for purification of a high temperature waste gas, comprising the steps of:
   preparing a mixture containing not more than 20 parts by weight of an alumina sol and one part by weight of activated alumina, said alumina sol containing 3 to 15 Wt% of alumina, said activated alumina containing not less than 60 Wt % of delta-alumina;
   coating said mixture onto the surface of the catalyst carrier;
   drying the coated catalyst carrier;
   firing the coated catalyst carrier at a temperature in the range of 150° to 850° C. for a time in the range of from 0.5 to 20 hours; and
   immersing the fired coated catalyst carrier in a solution containing a noble metal.

8. A method as claimed in claim 7, wherein said alumina sol is prepared by using alumina whose starting material is boehmite, and the starting material of said activated alumina is boehmite.

9. A method for preparing a catalyst for purification of exhaust gases discharged from automobile engines, said method comprising the steps of:
   preparing a mixture containing not more than 20 parts by weight of an alumina sol and one part by weight of activated alumina, said alumina sol containing 3 to 15 Wt % of alumina, said activated alumina containing not less than 60 Wt % of delta-alumina;
   coating said mixture onto the surface of the catalyst carrier;
   drying the coated catalyst carrier;

firing the coated catalyst carrier at a temperature in the range of 150° to 850° C. for a time in the range of from 0.5 to 20 hours and immersing the fired coated catalyst carrier in a solution containing a noble metal.

10. A method as claimed in claim 9, wherein said solution contains platinum and palladium.

11. A method as claimed in claim 9, further comprising firing the fired coated catalyst carrier after immersing in said solution.

12. A method as claimed in claim 9, wherein said alumina sol is prepared by using alumina whose starting material is boehmite, and the starting material of said activated alumina is boehmite.

13. A catalyst carrier for carrying a catalytic metal thereon, comprising:

a monolithic carrier base;

a high surface area coating formed on the surface of said monolithic carrier base, said high surface area coating is formed by firstly preparing a mixture containing not more than 20 parts by weight of alumina sol and one part by weight of activated alumina, said alumina sol containing 3 to 15 Wt % of alumina said activated alumina containing not less than 60 Wt % of delta-alumina, secondly coating said mixture onto the surface of said monolithic carrier base, thirdly drying the coated carrier base, and lastly firing the coated carrier base at a temperature in the range from 150° to 850° C. for a time in the range of from 0.5 to 20 hours.

14. A catalyst as claimed in claim 13, in which said alumina sol is prepared by using alumina whose starting material is boehmite, and the starting material of said activated alumina is boehmite.

15. A catalyst for purifying exhaust gases from automobile engines, comprising a monolithic carrier, a high surface area coating formed on the surface of said monolithic carrier, said high surface area coating being formed by firstly preparing a mixture containing not more than 20 parts by weight of alumina sol and one part by weight of activated alumina, said alumina sol containing 3 to 15 Wt % of alumina, said activated alumina containing not less than 60 Wt % of delta-alumina, secondary coating said mixture onto the surface of said monolithic carrier, thirdly drying the coated monolithic carrier, fourthly firing the coated catalyst carrier at a temperature in the range of 150° to 850° C. for a time in the range of from 0.5 to 20 hours, and lastly immersing the fired coated monolithic carrier in a solution containing a noble metal.

16. A catalyst as claimed in claim 15, in which said alumina sol is prepared by using alumina whose starting material is boehmite, and the starting material of said activated alumina is boehmite.

* * * * *